(12) United States Patent
Elser et al.

(10) Patent No.: US 7,476,175 B2
(45) Date of Patent: Jan. 13, 2009

(54) VARIATOR FOR AN INFINITELY VARIABLE TOROIDAL DRIVE OF A MOTOR VEHICLE

(75) Inventors: Wolfgang Elser, Weil der Stadt (DE); Steffen Henzler, Böbingen (DE)

(73) Assignee: Daimler AG, Stuttgart (DE)

(*) Notice: Subject to any disclaimer, the term of this patent is extended or adjusted under 35 U.S.C. 154(b) by 342 days.

(21) Appl. No.: 11/509,336

(22) Filed: Aug. 23, 2006

(65) Prior Publication Data
US 2007/0015623 A1 Jan. 18, 2007

Related U.S. Application Data

(63) Continuation-in-part of application No. PCT/EP2005/000196, filed on Jan. 12, 2005.

(51) Int. Cl.
*F16H 57/04* (2006.01)
(52) U.S. Cl. .................. 476/8; 476/7; 476/40; 476/42; 476/46; 476/47
(58) Field of Classification Search .............. 476/7, 476/8, 40, 42, 46, 47
See application file for complete search history.

(56) References Cited

U.S. PATENT DOCUMENTS

| | | | |
|---|---|---|---|
| 4,453,427 A | 6/1984 | Kraus et al. | |
| 5,417,620 A | 5/1995 | Lohr et al. | |
| 5,830,103 A | 11/1998 | Itoh et al. | |
| 5,971,885 A * | 10/1999 | Greenwood et al. | 476/8 |
| 6,238,318 B1 | 5/2001 | Itoh et al. | |
| 6,500,088 B2 * | 12/2002 | Sugihara | 476/8 |
| 6,524,213 B2 * | 2/2003 | Mori | 476/8 |
| 6,616,568 B2 * | 9/2003 | Ooyama | 476/40 |
| 6,733,416 B2 * | 5/2004 | Mori et al. | 476/46 |
| 2002/0039948 A1 | 4/2002 | Ooyama | |
| 2003/0190994 A1 | 10/2003 | Ishikawa et al. | |

FOREIGN PATENT DOCUMENTS

| | | |
|---|---|---|
| DE | 600 24 386 | 4/2001 |
| DE | 101 21 042 | 5/2003 |
| DE | 101 54 928 | 5/2003 |
| DE | 102 18 356 | 11/2003 |
| DE | 102 18 369 | 11/2003 |
| DE | 103 00 569 | 7/2004 |
| DE | 103 08 496 | 9/2004 |
| DE | 103 09 569 | 9/2004 |
| DE | 103 59 394 | 7/2005 |
| EP | 1 048 878 | 11/2000 |
| EP | 1 143 167 | 10/2001 |
| EP | 1 316 743 | 6/2003 |
| EP | 1 365 173 | 11/2003 |
| JP | 2001263442 | 9/2001 |
| JP | 2001330100 | 11/2001 |
| JP | 2002286110 | 10/2002 |
| WO | WO 97/37156 | 9/1997 |
| WO | WO 97/37156 | 10/1997 |

\* cited by examiner

*Primary Examiner*—David M Fenstermacher
(74) *Attorney, Agent, or Firm*—Klaus J. Bach

(57) ABSTRACT

In a variator for an infinitely variable toroidal drive including a support trunnion rotatably supporting motion transmitting traction rollers and means for the lubrication and cooling of the components of the variator, in particular of the bearings, throttles are provided in the lubricant lines directly adjacent to the bearings whereby the pressure level for lubricant is raised for an improved control of the flow of the lubricant to the different lubricating points.

18 Claims, 6 Drawing Sheets

VARIATOR FOR AN INFINITELY VARIABLE TOROIDAL DRIVE OF A MOTOR VEHICLE

This is a Continuation-In-Part Application of International Patent Application PCT/EP2005/000196 filed Jan. 12, 2005 and claiming the priority of German Patent application 10 2004 009 409.8 filed Feb. 24, 2004.

BACKGROUND OF THE INVENTION

The invention relates to a variator for an infinitely variable toroidal drive or transmission particularly of a motor vehicle including a support trunnion, a roller rotatably supported on the support trunnion and lubricant supply means for lubricating the various variator components In the variators for infinitely variable toroidal transmissions, particular attention is given to lubricating and/or cooling the mechanically stressed components. These components are, in particular, bearings (radial or axial bearings) which are indirectly or directly connected between a support trunnion, an eccentric shaft and/or a roller. There is a further need for lubrication and/or cooling in the region of the traction force-transmitting contacts between the roller and a toroidal disks.

From the publication U.S. Pat. No. 6,238,318, it is known to provide the support trunnion with bores, the outlet of which is arranged in the region of a lubrication point to be cooled and/or lubricated. Since the ambient pressure prevails in the region of the lubrication point, the lubrication point is supplied essentially at zero pressure. However, an exact optimum setting of the volume of lubricant and the pressure of the lubricant is not possible, so that an undefined distribution of lubricant to one or more lubrication points occurs. In particular, an unnecessarily high amount of lubricant may be delivered in the region of an axial needle bearing which serves to support an eccentric shaft with respect to the support trunnion in the direction of the axis of rotation of the roller.

The publication EP 1 143 167 discloses a solution, in which an eccentric shaft has a bore which is oriented in the longitudinal direction and is connected for lubricant purposes to radial bores which emerge from the eccentric shaft in the region of a radial needle bearing arranged between eccentric shaft and roller and of an axial ball bearing. Further bores are connected downstream of the radial needle bearing in the direction of the flow of lubricant and serve to lubricate the engagement surfaces between roller and toroidal disks. However, this lubrication is possible only if the radial needle bearing connected upstream in the direction of flow is supplied with lubricant to a sufficient extent.

The publication U.S. Pat. No. 6,616,568 discloses a pressurized lubricant supply wherein a sealed axial needle bearing is arranged between the support trunnion and the eccentric shaft. Problems arise with regard to the tightness, in particular if the components involved sag or deform elastically as a consequence of the mechanical stresses to which they are subjected. Furthermore, bores are provided which are arranged adjacent to the engagement or running surfaces of the roller and the diameters of which are reduced in comparison with further supply lines, which are connected thereto for lubrication purposes, and via which lubricant is applied to the engagement surfaces of the roller.

Further prior art is known, for example, from the publications U.S. Pat. No. 4,453,427, JP 2001 263442 A and EP 1 316 743 A2. The latter discloses rollers which have outlet channels with a narrowing cross-sectional width.

It is the object of the present invention to provide a variator which permits a simplified and/or improved lubrication and/or cooling of the mechanically stressed components of an infinitely variable toroidal transmission.

SUMMARY OF THE INVENTION

In a variator for an infinitely variable toroidal drive including a support trunnion rotatably supporting motion transmitting traction rollers and means for the lubrication and cooling of the components of the variator, in particular of the bearings, throttles are provided in the lubricant lines directly adjacent to the bearings whereby the pressure level for lubricant is raised for an improved control of the flow of the lubricant to the different lubricating points.

The support trunnion is to be mounted pivotally (under some circumstances with additional degrees of freedom) about an axis, which is preferably a longitudinal axis of the support trunnion, for an infinitely variable adjustment of the transmission ratio between a driving toroidal disk and an output toroidal disk by changing the effective radii of the contact surface circles between the roller and the toroidal disks.

The roller is mounted rotatably in relation to the support trunnion. In this case, the roller can be mounted directly or indirectly in relation to the support trunnion, in particular with the use of a shaft specifically an eccentric shaft.

At least two bearings, for example an axial bearing and a radial bearing, are connected between the roller and the support trunnion. In this case, the above-mentioned bearings can act directly or indirectly between the roller and the support trunnions, in particular with the interconnection of bearing disks or bushings.

Furthermore, the variator according to the invention has a lubricant supply device which is responsible for lubricating and/or cooling the components of the variator. The lubricant supply device comprises at least one lubricant line via which a lubricant point, which is arranged in the region of one of the abovementioned bearings, is supplied with a lubricant. The lubricant point is preferably the bearing or parts of the same, such as running surfaces or rolling bodies.

According to the invention, the lubricant line has a throttle in the region surrounding the lubricant point. The throttle is therefore not arranged in the region of a lubricant feed-in opening, for example of the support trunnion, for feeding by an adjacent component, but rather is arranged spaced apart from the feed-in opening in the direction of the flow of lubricant. This has the result that as far as the throttle, under some circumstances over longer conveying distances, an unthrottled conveying of the lubricant is possible under simple and defined conditions.

A throttle is understood as meaning, within the context of the invention, any cross-sectional change in the lubricant line which results in a change in the flow conditions, in particular in the pressure and/or speed conditions. Use can be made here, for example, of a conventional throttle, orifice or nozzle, of any desired curved transition contour or of the transition of a constant, relatively large cross-sectional region to a constant, relatively small cross-sectional region, if appropriate with the interconnection of a transition region.

As a result of the arrangement according to the invention of a throttle in the lubricant line, the pressure level which is necessary for the conveying of the lubricant can be raised. This permits a more exact setting of the conveying volume of the lubricant by means of a precise control of the pressure, thus avoiding excessive amounts of lubricant to be supplied, that is, making it possible to reduce or prevent inadequate supplies of lubricant. As an alternative or in addition, the invention makes it possible for the speed of the lubricant to be increased in the region of the throttle, so that the lubricant enters the lubrication point at increased speed, which, under some circumstances, leads to an improvement in the distribution of the lubricant at the lubrication point.

The throttle according to the invention can be formed as a single piece with a component which is present in any case, such as the eccentric shaft or the support trunnion, by providing corresponding restrictions, in particular bores. Alternatively, the throttle can be designed in multi-piece form, for example by means of an insert in components, such as roller, eccentric shaft or support trunnion, arranged adjacent to the lubrication point.

In a particular embodiment of the invention, the throttle is arranged in the region of a shaft (eccentric shaft) supporting the roller. Bearings are conventionally provided on the circumferential surface of the shaft, with the result that the throttle is arranged in the direct vicinity of a lubricating point. Furthermore, a component which is present in any case can be used as the site for arranging the throttle, which further increases the compactness of the variator. The shaft supporting the roller is usually a component which is manufactured in any case with high precision, and so the additional arrangement of the throttle does not signify an undue additional outlay with regard to the manufacturing conditions for the shaft. Other lines serving to supply lubricant, for example in the region of the support trunion, can be manufactured with larger cross sections, as a result of which, firstly, the manufacturing is simplified and, secondly, the sensitivity of the line to elastic deformations and/or foreign particles is reduced.

According to a development of the variator, at least two lubricant lines with a respective throttle are supplied via a common main lubricant line. Relatively long lubricant distances can be covered by the main lubricant line with, under some circumstances, a large cross section and low losses and good lubricant flows. Since such cross sections are unsuitable for the lubrication point, a division into the at least two lubricant lines takes place under suitable adaptation of the pressures and speeds of the lubricant, in particular in the region of the lubrication points. Under certain circumstances, this shortens the effective lengths of the lubricant lines with small cross sections, which avoids possible blockages, simplifies the manufacturing and reduces the costs.

In a preferred refinement of a variator, the throttles of different lubricant lines differ in configuration. Accordingly, the different throttles bring about different flow conditions at the associated lubrication points. The conveying of lubricant can therefore be matched, in particular with regard to pressure and/or speed, to the particular lubrication point. For example, a mounting of the eccentric shaft in relation to the support trunnion requires a smaller amount of lubrication, since this bearing executes a small pivot movement only in order to adjust the transmission ratio in a deformed state of the variator or during changing deformations of the variator. By contrast, in the case of the mounting of the roller in relation to the components supporting it, high relative speeds occur under high mechanical stresses, so that there is a need for a large amount of lubricant at such lubricant points. By means of the different throttles, in particular the lubricant supply capacity is matched to the particular requirements at the lubrication points. In the abovementioned example, this would mean that a greater lubricant supply throttle effect is to be provided for the bearing structure of the eccentric shaft than for the bearing structure of the roller.

In particular, the main lubricant line is formed by an eccentric-shaft bore which is oriented approximately in the longitudinal direction of the eccentric shaft. The main lubricant line therefore extends over a partial region of the eccentric shaft or over the entire length of the eccentric shaft and therefore past a plurality of lubrication points. A supply of lubricant to and/or removal of the lubricant from the bore of the eccentric shaft takes place at an axial end side of the shaft and/or via bores oriented approximately radially.

The axial bore, the radial bore, the lubricant line or the main lubricant line is preferably formed with a blind bore into which another bore leads. This constitutes a particularly simple manufacturing possibility, with the blind bore being automatically sealed at the base of the bore, and the bore opening being able to serve as inlet or outlet opening for the lubricant. As an alternative, use can be made of a through-bore which forms two inlet and/or outlet openings. Also, one opening of the through bore may be closed by a closure element.

In a particular embodiment of the variator according to the invention, the main lubricant line has, in addition to the approximately axial bore of the eccentric shaft, a supply line in the support trunnion. The axial bore and the supply line lead to a transfer space. The transfer space is bounded by an end surface of the eccentric shaft, which is held in a blind bore of the support trunnion, and by a free partial region of the blind bore. A bore which is necessary in any case for the mounting of the eccentric shaft therefore serves as the transfer space without additional construction space or outlay on manufacturing being necessary. In addition, a transfer space of this type, under some circumstances, makes the transfer of the lubricant independent of any elastic deformations of the components. Any leakages of the transfer space can be used, in particular, for conveying lubricant to a lubrication point in a manner corresponding to a "bypass".

In a preferred embodiment of the invention, it is likewise possible for a sealing element for sealing the transfer space to act between the blind bore and the eccentric shaft. In this way, undesired bypass flows can be at least substantially avoided.

A particularly compact design of the arrangement is obtained if the sealing element is integrated in a radial bearing which serves for the radial, rotatable supporting of the eccentric shaft in relation to the support trunnion. As an alternative, it is possible to arrange the sealing element in the axial direction of the eccentric shaft between the radial bearing and the transfer space.

The lubricant line preferably includes bores in the roller. The bores are oriented in the direction toward the running surface of toroidal disks in engagement with the roller. In particular, the abovementioned bores are arranged directly adjacent to the running surface of the roller, with the result that they are used to apply lubricant to the toroidal disks adjacent to the contact surface between roller and toroidal disks. In the course of the rotational movement and/or the application of the lubricant at a certain outlet speed, the lubricant is distributed to the toroidal disk even into regions which serve directly or in the course of a rotational movement as contact surface between roller and toroidal disks. Furthermore, partial regions of the toroidal disk can thereby be provided with a lubricant, which partial regions serve as contact surface after an adjustment of the roller to change the transmission ratio.

In a further refinement, the invention proposes feeding lubricant to the bores of the roller via a second transfer space. The second transfer space is bounded by a free partial region of a blind bore of the roller, in which bore the eccentric shaft is arranged, and by an end surface of the eccentric shaft. The second transfer space makes the transfer of lubricant from the eccentric shaft to the roller independent of the mechanical stresses. Furthermore, components which are present in any case can be used as the transfer space, which simplifies the manufacturing and reduces the outlay on components and outlay on construction space.

For a further variator embodiment according to the invention, a plurality of bores of the roller extends from the second transfer space to different partial regions of the running surface of the toroidal disks. These bores are correlated with running surfaces which are assigned to different active radii on the toroidal disks, and/or are offset in the circumferential direction of the roller. In this way, the lubricant supply to the contact surfaces between roller and toroidal disks is improved in a simple manner.

According to a development according to the invention of the variator, a lubricant line for a radial bearing between roller and eccentric shaft, a lubricant line for an axial bearing between retaining clamp and eccentric shaft, and the bores of the roller for the running surface of one or more toroidal disks are fed by a common main lubricant line. As a result, only one main lubricant line has to be supplied with a suitable pressure and a conveying volume while a division of the amount of lubricant for the different lubricating points takes place in the interior of the components of the variator. The division of the lubricant can then be adapted in terms of amount and pressure exactly and simply to the requirements.

Furthermore, the invention proposes, to provide by means of design, that lubricant guided through the radial bearing can be supplied to the bores of the roller. Accordingly, the two lubricating points, radial bearing and running surface, are connected one behind the other in the direction of flow of the lubricant, so that at least part of the same lubricant can be used for both lubricating points.

The support trunnion preferably has at least one (additional) lubricant line, the opening of which is oriented in the direction of the running surface of the roller and/or the running surface of the toroidal disk. In this way, the lubrication and/or cooling of the contact surface between toroidal disk and roller can be improved. The abovementioned lubricant line preferably has a throttle in the support trunnion for supplying the running surface of the toroidal disks or of the roller, as a result of which a specific setting of the lubricant ratios is also possible for this lubricant line. A particularly simple construction arises if lubricant lines for supplying a lubrication point in the region of a bearing and lubricant lines for lubricating the contact surface between toroidal disks and roller are supplied via a common main lubricant line.

Preferred exemplary embodiments of the variator according to the invention are explained in more detail below with reference to the accompanying drawing:

DESCRIPTION OF VARIOUS EMBODIMENTS

The invention is used for variators of toroidal drives, particularly for motor vehicles. In this case, the toroidal transmission component can be in the form of a semi-toroid or a full-toroid. With regard to the basic design of a toroidal drive of this type, reference is made, merely by way of example, to the publications DE 102 18 356 A1, DE 101 54 928 A1 and DE 101 21 042 C1.

Figure 6:
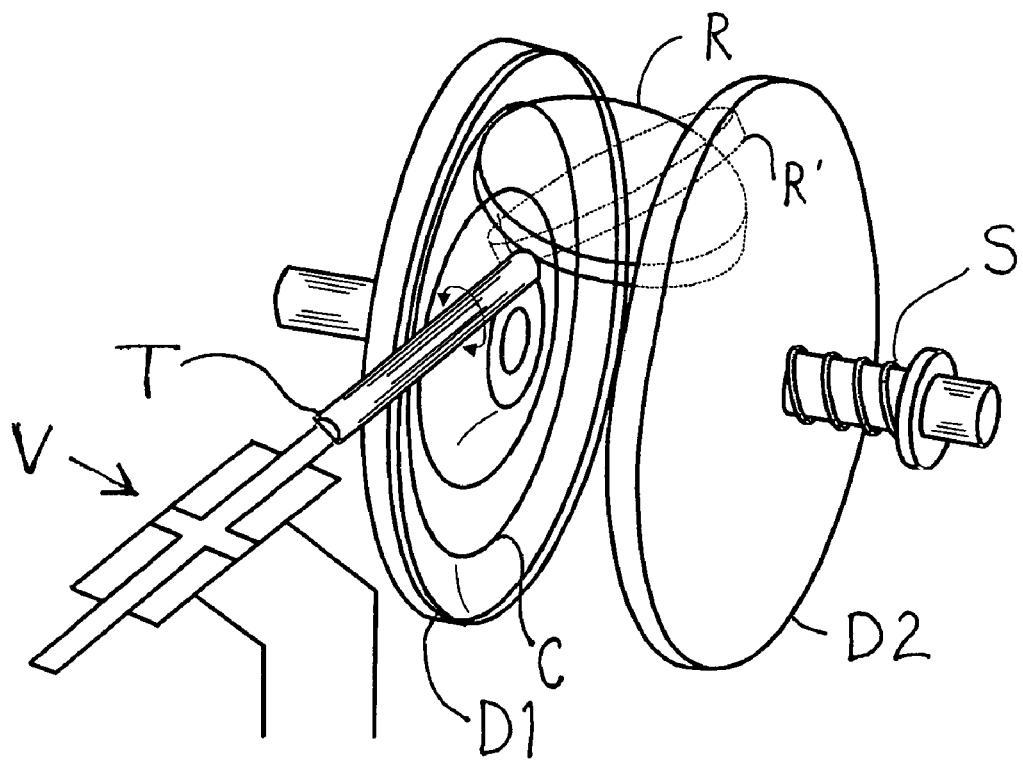
FIG. 6 shows, in principle, a toroidal drive with an infinitely variable transmission ratio.

As schematically shown in FIG. 6, an infinitely variable toroidal drive comprises two toroidal disc D1 and D2, which, for the transmission of motion therebetween, are biased toward each other, for example, by a spring S and into engagement with at least one roller R disposed therebetween. The roller R is pivotally supported by a variator V by which its pivot position can be controlled in order to adjust the transmission ratio between the two toroidal discs D1 and D2, which depends on the radius of the circles of contact C at which the roller R is engaged by the toroidal disc D1, D2. The roller R is shown in FIG. 6 in two positions providing for different transmission ratios. The pivot position of the roller R is adjustable by the variator V which is adapted to move the roller support trunnion T slightly axially for causing the roller R to walk to different circles of engagement with the two toroidal disc while pivoting the support trunnion T and thereby changing the transmission ratio between the toroidal discs D1, D2.

With regard to a suitable hydraulic adjusting device for influencing the positions of a support trunnion of the variator according to the invention and a pressure supply for the lubricant supply device by adjacent components not illustrated in the drawing, reference is made by way of example to the abovementioned prior art and the not published publications from the patent referred to in DE 103 08 496. With regard to a coupling of the movement of individual adjusting devices and retaining clamp, reference is made by way of example to the not published publication DE 103 09 569. A suitable means of controlling the adjusting device is disclosed, for example, in the publication DE 103 00 569. The supporting of the support trunnion or of the roller is disclosed, for example, in the abovementioned prior art or the not pre-published publication DE 103 59 394.

A variator 20, only parts of which are illustrated, serves to infinitely variably change the transmission ratio between at least one driving toroidal disk and one output toroidal disk. For this purpose, a roller 21 is clamped on opposite sides of its circumferential surfaces between the toroidal disks. For the exemplary embodiments illustrated in FIG. 1 and FIG. 2, the toroidal disks rotate in each case about an axis oriented perpendicular with respect to the plane of projection and are arranged (not illustrated) above and below the plane of projection. For the exemplary embodiments illustrated in FIG. 3 to FIG. 5, the toroidal disks rotate in each case about an axis oriented horizontally in the plane of projection and are arranged (not illustrated) to the sides of the rollers.

The roller 21 is supported radially in relation to an eccentric shaft 22. For this purpose, the roller 21 has a central blind bore 23 in which a radial bearing, in particular needle bearing 24, is held. Radially on the inside, the needle bearing 24 rolls along a journal 25 of the eccentric shaft 22, which journal is formed concentrically with respect to an axis (X-X).

In addition to the journal 25, the eccentric shaft 22 has a further journal 26 which is formed concentrically with respect to an axis (X'-X'). The axis X'-X' is arranged parallel to and spaced apart from the axis X-X. In the transition region between the journals 25, 26, the eccentric shaft 22 has a circular-ring-shaped extension 27, the outside diameter of which approximately corresponds to the diameter of the roller 21. An axial bearing 28, for example an axial ball bearing, is connected between mutually facing end surfaces of the roller 21 and of the extension 27, which end surfaces are oriented transversely with respect to the axis X-X. Running surfaces matched to the rolling bodies 29 of the axial bearing 28 are provided in the end surfaces of the roller 21 and of the extension 27 and are provided with a suitable surface and with advantageous material properties. The rolling bodies 29 are, in particular, guided in a cage. The eccentric shaft 22 is supported on a support trunnion 30. For this purpose, the support trunnion 30 has a blind bore 31 in which a radial bearing 32, in particular a needle bearing, is accommodated. The eccentric shaft 22 is supported in relation to the support trunnion 30 in the direction of the axis X-X via an axial bearing 33 which is arranged between mutually facing end surfaces of the support trunnion 30 and of the extension 27, which end surfaces are in each case oriented transversely with respect to the axis X-X. The axial bearing 33 can be designed as a rolling bearing, in particular needle bearing, or as a sliding bearing. In the radial bearing 32, the eccentric shaft 22 is mounted in the region of the journal 26.

In the longitudinal section illustrated, the support trunnion 30 is approximately U-shaped, with a base part 34, in which the eccentric shaft 22 is mounted approximately centrally or offset laterally, and two parallel side parts 35, 36 between which the eccentric shaft 22 and the roller 21 are at least partially arranged. In the end region lying opposite the basic part 34, the side parts 35, 36 have extensions or journals 37, 38 which in each case extend outward and parallel to the base part 34 and coaxially with respect to one another.

The journals 37, 38 at least partially have a cylindrical circumferential surface, which surfaces serve in each case as an inner bearing surface of a bearing unit. With regard to the connection of these bearing surfaces to adjacent components, reference is made to the publication DE 103 59 394, the content of which is made part of the present disclosure.

A force transmission element 39 is inserted into the journal 38 in the longitudinal direction. A connection of the support trunnion to adjacent components and a mounting in relation to the same take place in such a manner that, in order to adjust the transmission ratio of the variator 20, a pivoting of the support trunnion about an axis Y-Y, which runs centrally through the journals 37, 38, takes place. In addition to the degrees of freedom illustrated, the support trunnion can have further degrees of freedom, cf. the publication DE 103 59 394.

To supply the variator with a lubricant, a supply space 40 is provided between the force transmission element 39 and the journal 38, to which supply space a predetermined controllable volume of a pressurized lubricant is supplied. The main parts of the lubricant line 41, 42 disposed one behind the other connect the supply space 40 to a transfer space 43. The transfer space 43 is of approximately cylindrical design, with a circular boundary being formed by an end surface of the eccentric shaft 22 and the circumferential surface, and the other bounding circular surface being formed by the blind hole bore 31. The main lubricant line part 41 extends in the manner illustrated through the journal 38, the side part 36 and an end region of the base part 34 at an angle of 25° to 55° with respect to the axis X-X and is designed as a blind bore ending in the base part 34. That end of the bore which lies opposite the base part 34, i.e. the opening of the bore outward, is closed by a closure structure 44. The main lubricant line part 42, which intersects the main lubricant line part 41 or is fluidically connected thereto, and the outlet opening of which is closed to the outside by a closure element 45 and which ends in the region of the transfer space 43, is provided approximately in the longitudinal direction of the base part 34 and approximately parallel to the axis Y-Y.

The radial space between blind bore 31 and the journal 26, into which lubricant could enter from the transfer space 43, is sealed with a sealing element 46. The sealing element 46 is preferably a sealing ring which is inserted into a circumferential groove of the journal 26. The sealing element 46 is arranged in the direction of the axis X'-X' between the radial bearing 32 and the transfer space 43.

A main lubricant line part 47 extends from the transfer space 43 in the form of a bore through the journals 25, 26 at an acute angle to the axis X-X. Lubricant branch lines 48, 49, 50 which are arranged one after another in the abovementioned sequence in the direction of the axis X-X, are in communication with the main lubricant line part 47.

The lubricant lines 48, 49 are oriented transversely, i.e. radially, with respect to the axis X-X, and extend into the journal 25 from the outside as blind bores. The lubricant lines 48, 49 end in the main lubricant line part 47. The radially outer initial diameter of the bores for the lubricant lines 48, 49 corresponds essentially to the diameter of the main lubricant line part 47. In the transition region of the lubricant lines 48, 49 to the main lubricant line 47, the lubricant lines 48, 49 each have a throttle 51, 52.

Figure 1:
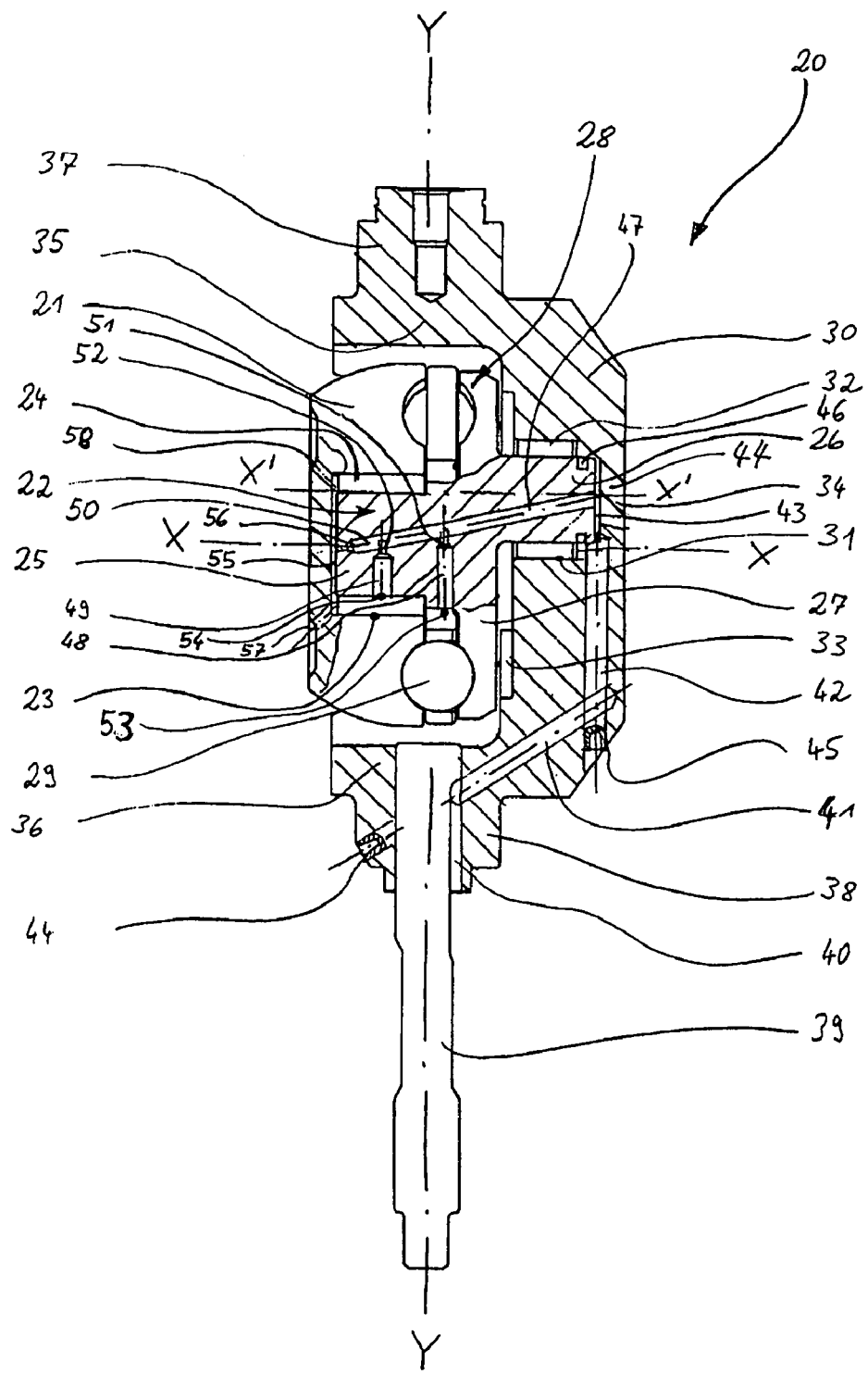
FIG. 1 shows, in longitudinal section, part of a variator according to the invention in accordance with a first embodiment, with a support trunnion, an eccentric shaft and a roller.

In the exemplary embodiment illustrated in FIG. 1, the throttles 51, 52 are in the form of reduced diameter bores in the lubricant lines 48, 49. Their diameters are formed in the manner of a jump or with a transition region, in particular with a phase. The lubricant line 48 extends to a lubricating point 53 which is assigned to the axial bearing 28. The lubricant line 49 extends to a lubricating point 54 for lubricating the needle bearing 24. The lubricant line 50 connects the main lubricant line part 47 to a second transfer space 55, which is essentially cylindrical and the one circular boundary surface of which is formed by an end surface of the journal 25 (and of the needle bearing 24) and which has, as boundary surfaces, the bottom of the blind bore 23 and the side wall of the blind bore 23. The lubricant line 50 initially continues the main lubricant line part 47 with an unchanged cross section and is provided at its end with a throttle 56, which is formed by a tapering of the cross section, into the second transfer space 55.

Bores 57, 58 which are oriented at an angle between 0° and 60° with respect to the axis X-X and are provided radially on the outside lead into the roller 21 from that end surface thereof which faces away from the retaining clamp.

The lubricant supplied to the supply space 40 passes through the main lubricant line parts 41, 42 into the transfer space 43 and from there into the main lubricant line part 47. Following this, the conveyed lubricant is divided between the lubricant lines 48, 49, 50 in accordance with the throttle cross sections present.

The partial volumetric flow of lubricant assigned to the lubricant line 50 is supplied via the second transfer space 55 to the bores 57, 58 and sprayed onto the running surfaces of the toroidal disks.

Figure 2:
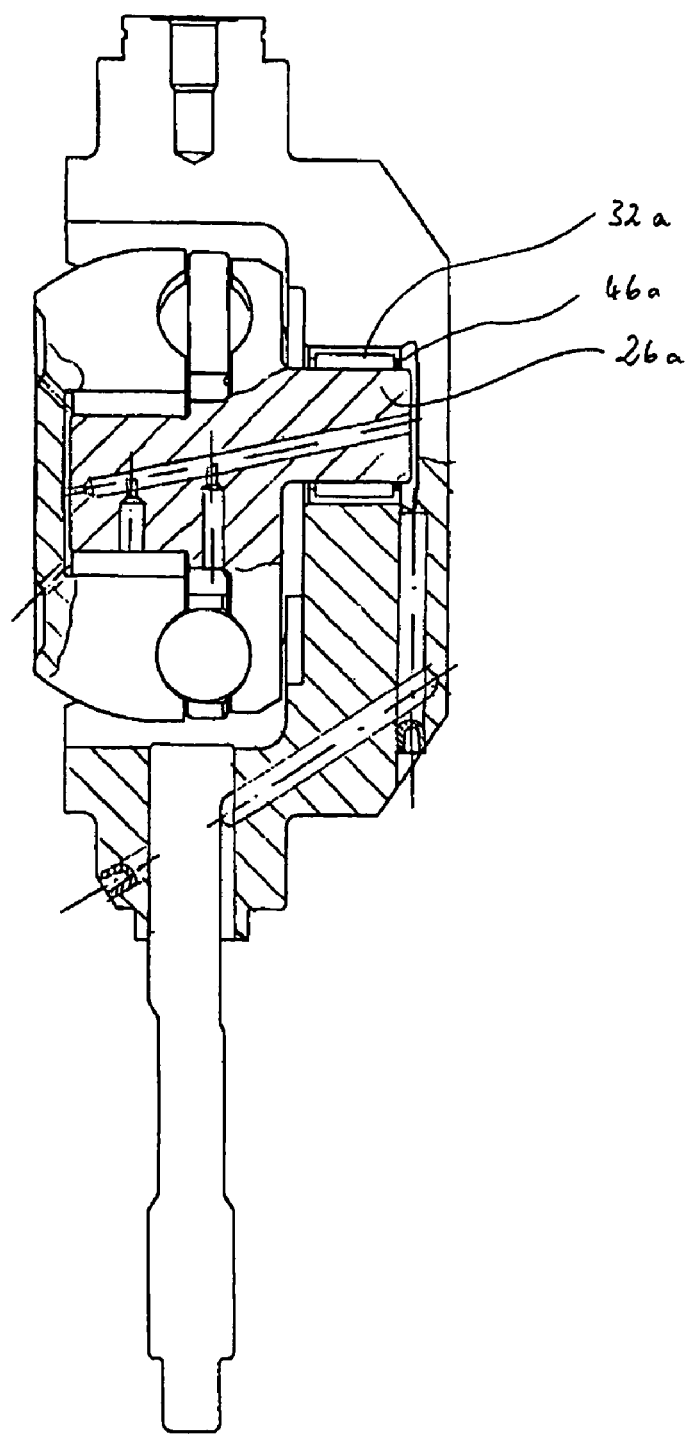
FIG. 2 shows, in longitudinal section, part of a variator according to the invention in accordance with a second embodiment, with a support trunnion, an eccentric shaft and a roller.

For the exemplary embodiment illustrated in FIG. 2, the sealing element 46*a* (with the configuration otherwise corresponding to FIG. 1) is not placed into a groove of the journal 26a but rather is an integral part of the radial bearing 32a. The sealing element 46a is supported radially to the inside on the circumferential surface of the journal 26a and radially to the outside on a bearing sleeve of the radial bearing 32a, which, in addition to receiving the sealing element 46a, if appropriate, guides the needles of the radial bearing 32a.

Figure 3:
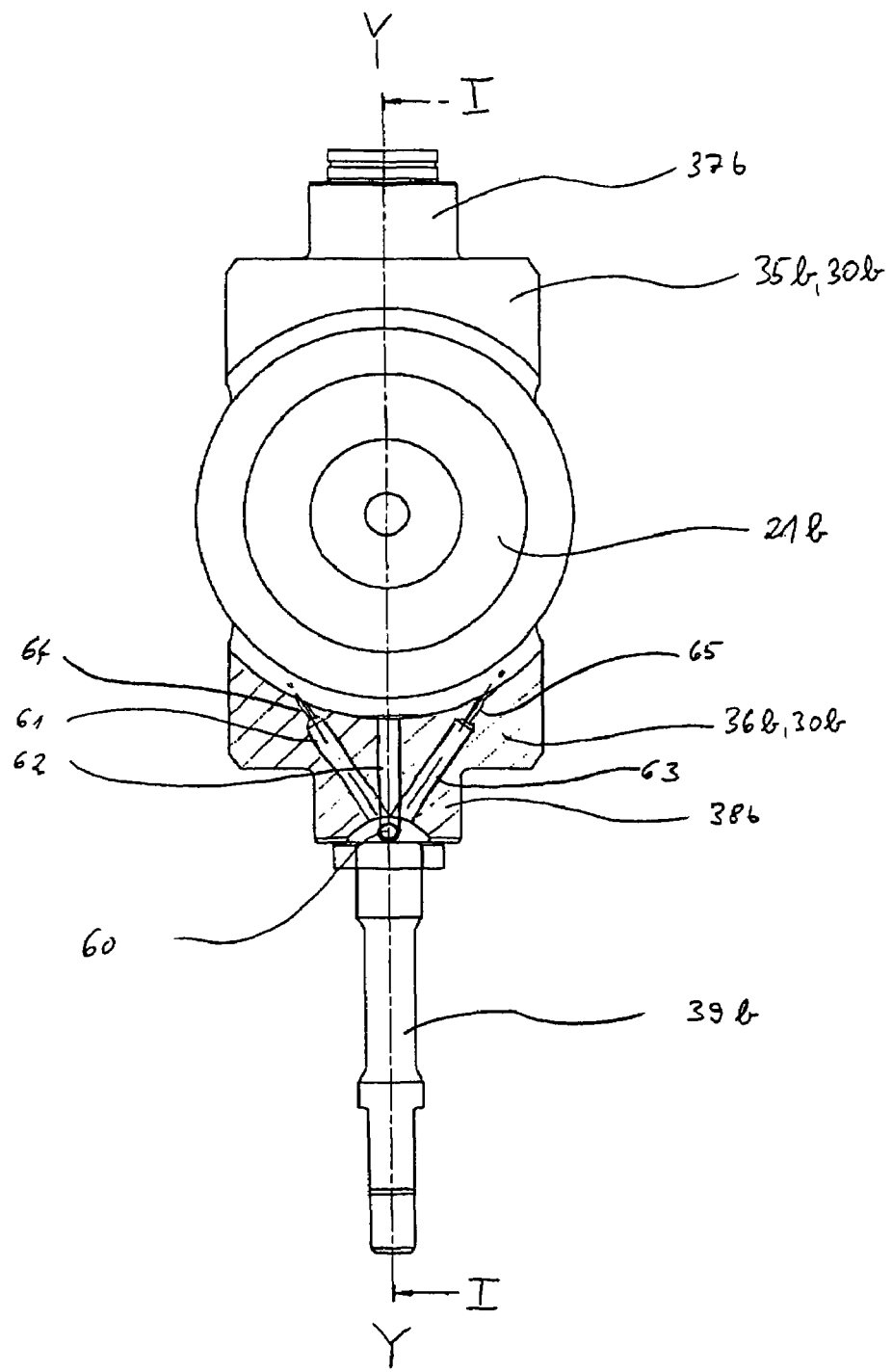
FIG. 3 shows, in longitudinal section, part of a variator according to the invention in accordance with a third embodiment, with a support trunnion, an eccentric shaft and a roller.
Figure 4:
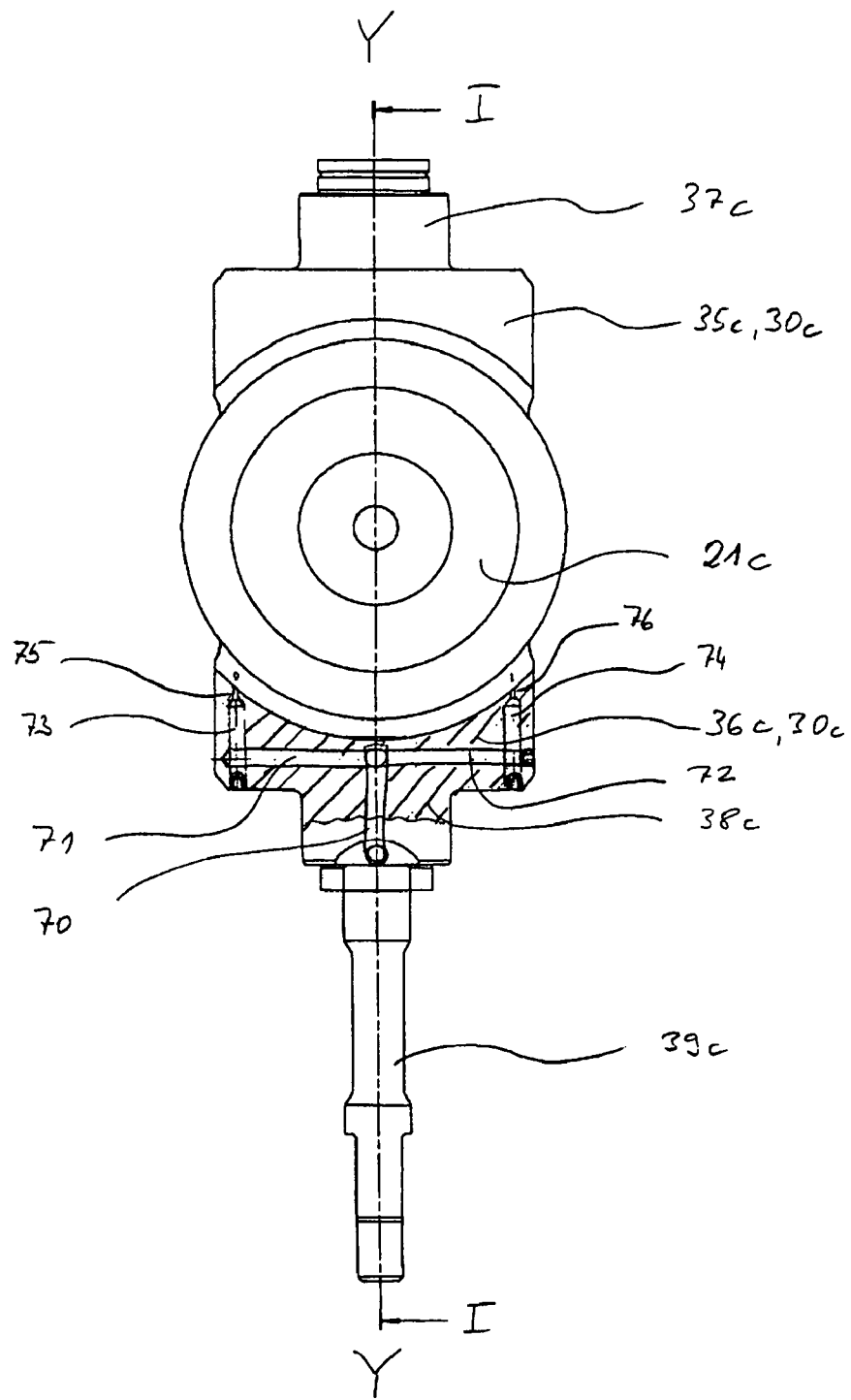
FIG. 4 shows, in longitudinal section, part of a variator according to the invention in accordance with a fourth embodiment, with a support trunnion, an eccentric shaft and a roller.
Figure 5:
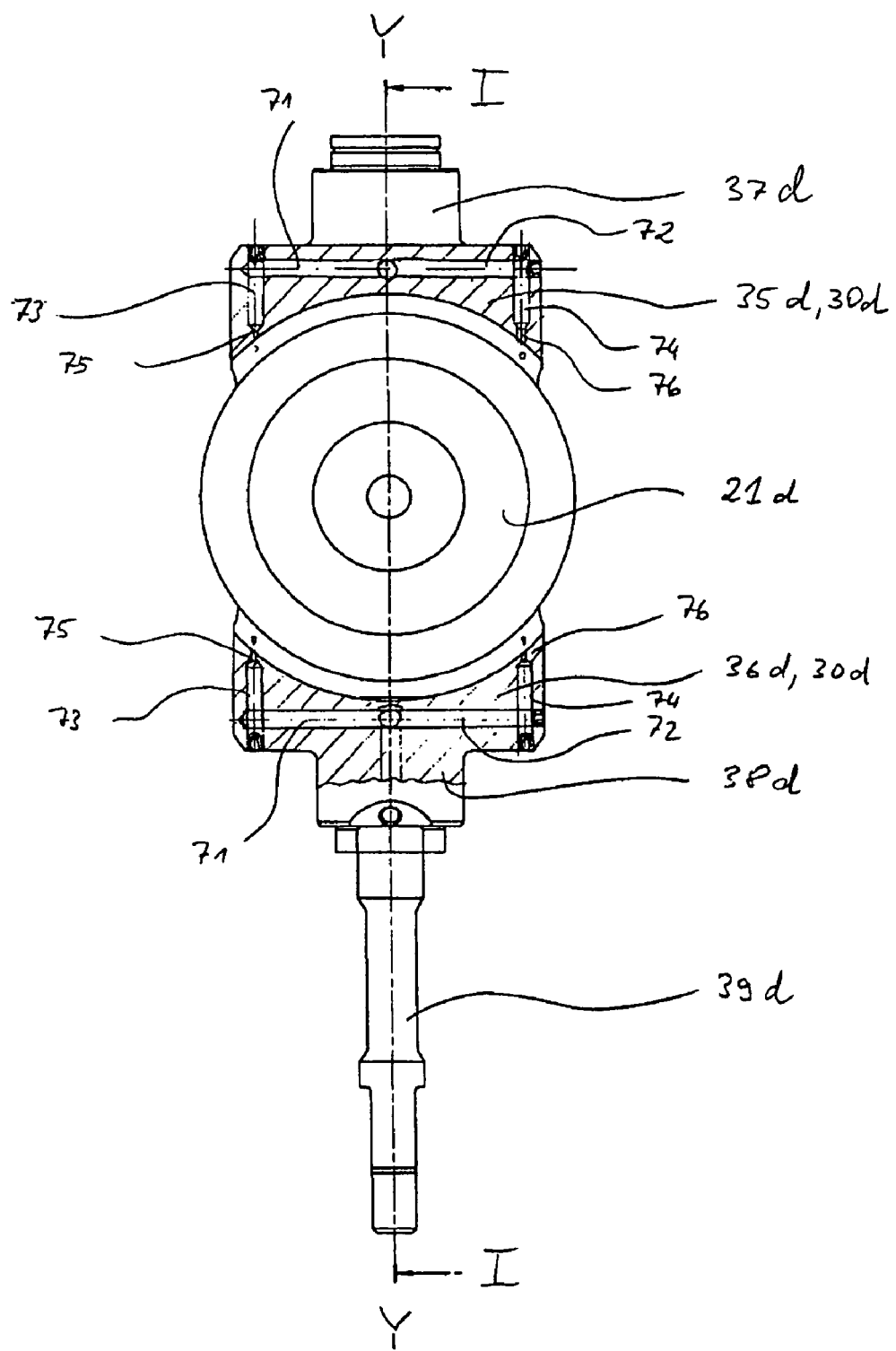
FIG. 5 shows, in longitudinal section, part of a variator according to the invention in accordance with a fifth embodiment, with a support trunnion, an eccentric shaft and a roller.

FIGS. 3 to 5 show, as an alternative or in addition, a possibility for applying the lubricant to the running surface of the roller 21 and the contact surface between roller 21 and toroidal disks:

According to FIG. 3, a main lubricant line (not illustrated) branches in a star-shaped manner from a common connecting point 60 into the lubricant lines 61, 62, 63. In this case, the lubricant line 62 is the main lubricant line part 41 shown in FIG. 1. The connecting point 60 is arranged in the region of the journal 38b. The lubricant lines 61, 62, 63 extend through the journal 38b and the side part 36b. The lubricant lines 61, 63 emerge from the side part 36b on the side facing the roller 21b, with the central lubricant line 62 being oriented approximately radially and in the direction of the center point of the roller 21b while the lubricant lines 61, 63 are oriented approximately tangentially to the roller 21b. In the end region facing the roller 21b, the lubricant lines 61, 63 each have a throttle 64, 65 which have approximately the same cross section and are formed by a tapering of the cross section of the lubricant lines 61, 63, with the interposition of a transition region with a phase. In particular, the lubricant line 62 does not have a throttle. In the section illustrated in FIG. 3, that side surface of the side part 36 which faces the roller 21b is designed essentially concentrically with respect to the circumferential surface of the roller 21b, so that an annular gap segment is formed between the side part 36b and the roller 21b. As illustrated in FIG. 3, the lubricant lines 61 to 63 can be arranged in a plane, or can be arranged partially offset with respect to the plane of projection according to FIG. 3. The outlet openings of the lubricant lines 61 to 63 are directed in the direction of the running surface of the roller 21b, in the direction of the axial bearing 28b and/or in the direction of running surfaces of the toroidal disks.

According to the exemplary embodiment illustrated in FIG. 4, a main lubricant line part 70 is arranged parallel to, in particular coaxial with, the axis Y-Y. The main lubricant line part 70 leads into two lubricant lines 71, 72 which are oriented away from each other, are coaxial with respect to each other and are aligned essentially transversely with respect to the axis Y-Y. The lubricant lines 71, 72 do not have an outlet opening to the outside. On the contrary, the lubricant lines 71, 72 each extend to lubricant lines 73, 74 which are oriented essentially parallel to the axis Y-Y and transversely with respect to the lubricant lines 71, 72. The lubricant lines 73, 74 each exclusively have outlet openings which are oriented in the direction of the roller 21c. In the end region adjacent to the roller 21c, the lubricant lines 73, 74 each have a throttle 75, 76. The outlet openings of the lubricant lines 73, 74 have the effect that the lubricant does not strike against the roller 21c centrally, parallel to the axis Y-Y, but rather at a distance of one fifth to one third of the radius. A further lubricant line can continue the main lubricant line part 70 in the direction of the roller 21c, with or without the interposition of a throttle.

While, according to FIG. 4, lubricant lines are only arranged on the side facing the force transmission element 39, for the exemplary embodiment illustrated in FIG. 5, in order to supply lubricant to the running surfaces, lubricant lines 70-76 are provided on both sides of the roller 21d with the configuration otherwise corresponding.

In a further embodiment of the invention, instead of the eccentric shaft 22, a journal or a shaft is provided, as is illustrated in the not previously published DE 103 59 394.2. In particular, in this context of the mounting of the roller, the content of DE 103 59 394.2 should also be regarded as incorporated in this application. Accordingly, instead of the eccentric shaft 22, in particular a journal can be provided which is designed without an eccentric and which is designed as a single part together with the roller or the support trunnion.

What is claimed is:

1. A variator for an infinitely variable toroidal drive, comprising:
   a support trunnion (30), including journals (37, 38) for supporting the support trunnion (30) so as to be pivotable about an axis (Y-Y),
   a roller (21), rotatable supported on the support trunnion (30) so as to be rotatable about an axis (X-X), with at least two bearings (24, 28, 32, 33) being disposed between the roller (21) and the support trunnion (30), and
   a lubricant supply arrangement including at least one lubricant line (48, 49, 50) for supplying lubricant to a lubrication point (53, 54) in the region of the bearings (24, 28, 32, 33),
   said at least one lubricant line (48, 49, 50) being connected to a main lubricant line (41, 42, 43, 47) formed by a bore oriented approximately in the longitudinal direction of, and extending through, one of the journals (26) of an eccentric shaft (22) on which the roller (21) is rotationally supported and which faces the support trunnion (30),
   there being a continuous connection between parts of the main lubricant line (41, 42, 43) arranged in the support trunnion (30) and the main lubricant line (41, 42, 43, 47), and
   the at least one lubricant line (48, 49, 50) having a throttle (51, 52) in the region adjacent the lubrication point (53, 54).

2. The variator as claimed in claim 1, wherein the throttle (51, 52) is arranged in the interior of one
   of the shaft (eccentric shaft 22) supporting the roller (21), and
   the journal supporting the roller (21).

3. The variator as claimed in claim 1, wherein at least two lubricant lines (48, 49, 50) each with a respective throttle (51, 52) are provided and supplied via a common main lubricant line (41, 42, 43, 47).

4. The variator as claimed in claim 3, wherein the throttles (51, 52) of different lubricant lines (48, 49) differ in configuration.

5. The variator as claimed in claim 1, wherein the lubricant line is formed by a radial bore (lubricant line 48, 49) of one of
   the shaft (eccentric shaft 22) supporting the roller (21), and
   the journal supporting the roller (21).

6. The variator as claimed in claim 5, wherein at least one of the bore which is oriented approximately in the longitudinal direction (main lubricant line part 47) and the radial bore (lubricant line 48, 49)
   of the shaft (eccentric shaft 22) supporting the roller (21), or
   of the journal supporting the roller (21) is a blind bore into which another bore (main lubricant line part 47) leads.

7. The variator as claimed in claim 1, wherein the bore (47) which is oriented approximately in the longitudinal direction and the main lubricant line parts (41, 42) lead into a transfer space (43) which is bounded by an end surface
   of one of the shaft (eccentric shaft 22) supporting the roller (21), and the journal supporting the roller (21), and which shaft or journal is supported in a blind bore (31) of the support trunnion, and by a free partial region of the blind bore (31).

8. The variator as claimed in claim 7, wherein a sealing element (46) for sealing the transfer space (43) is disposed between the blind bore (31) and one of the shaft (eccentric shaft 22) supporting the roller (21), and
the journal supporting the roller (21).

9. The variator as claimed in claim 8, wherein a radial bearing (32) is provided which serves for radially rotatably supporting at least one of the shaft (eccentric shaft 22) supporting the roller (21), and
the journal supporting the roller (21) in relation to the support trunnion (30), and the sealing element (46) is arranged in the axial direction of the blind bore (31) between the radial bearing and the transfer space (43).

10. The variator as claimed in claim 8, wherein a radial bearing (32a) is provided which serves for radially and rotatably supporting one of the shaft (eccentric shaft 22) supporting the roller (21) and
the journal supporting the roller (21) on the support trunnion (30), and the sealing element (46a) is integrated in the radial bearing (32a).

11. The variator as claimed in claim 1, wherein the lubricant line has bores (57, 58) in the roller (21), which bores are oriented in the direction of the running surface of toroidal disks in driving connection with the roller (21).

12. The variator as claimed in claim 11, wherein lubricant is supplied to the bores (57, 58) of the roller (21) via a second transfer space (55) which is bounded by an end surface of at least one of the shaft (eccentric shaft 22) supporting the roller (21) and
the journal supporting the roller (21), said shaft or journal being arranged in a blind bore (23) of the roller (21) by a free partial region of the blind bore (23).

13. The variator as claimed in claim 12, wherein a plurality of bores (57, 58) of the roller (21) extend from the second transfer space (55) to different partial regions of the running surface of the toroidal disks.

14. The variator as claimed in claim 11, wherein lubricant is supplied to a lubricant line (49) for a radial bearing (24) between roller (21) extends between one of
the shaft (eccentric shaft 22) supporting the roller and
the journal supporting the roller (21), and
a lubricant line (48) for an axial bearing (28) extending between the support trunnion (30) and at least one of
the shaft (eccentric shaft 22) supporting the roller (21) and
the journal supporting the roller (21), and
to the bores (57, 58) of the roller (21) for lubricating the running surface of the toroidal disk via the main lubricant line (41, 42, 43, 47).

15. The variator as claimed in claim 14, wherein lubricant guided through the radial bearing (24) is supplied to the bores (57, 58) of the roller (21).

16. The variator as claimed in claim 1, wherein the support trunnion (30) includes at least one lubricant line (60, 61, 62; 71, 72, 73, 74), the opening of which is oriented in the direction of at least one of the running surface of the roller (21) and the running surface of the toroidal disk.

17. The variator as claimed in claim 16, wherein the support trunnion (30) is approximately U-shaped in longitudinal section, and at least one lubricant line (60, 61, 62; 71, 72, 73, 74) is arranged in the region of at least one side part (35, 36) of the U-shaped longitudinal section of the support trunnion (30).

18. The variator as claimed in claim 16, wherein the lubricant line (60, 61, 62; 73, 74) has a throttle (64, 65; 75, 76) in the support trunnion (30) for supplying the running surface.

\* \* \* \* \*

UNITED STATES PATENT AND TRADEMARK OFFICE
CERTIFICATE OF CORRECTION

PATENT NO. : 7,476,175 B2  Page 1 of 1
APPLICATION NO. : 11/509336
DATED : January 13, 2009
INVENTOR(S) : Wolfgang Elser et al.

It is certified that error appears in the above-identified patent and that said Letters Patent is hereby corrected as shown below:

On the title page, in Column 1, item (30) should read:

--(30)    Foreign Application Priority Data

Feb. 24, 2004    (DE)    ......................10 2004 009 409.8--

Signed and Sealed this
Twenty-second Day of April, 2014

Michelle K. Lee
*Deputy Director of the United States Patent and Trademark Office*